United States Patent
Porsche

[15] 3,635,489
[45] Jan. 18, 1972

[54] SEAT FOR A ONE-TRACK SLIDING VEHICLE

[72] Inventor: Ferdinand Alexander Porsche, Doffingen, Germany

[73] Assignee: Firma Dr.-Ing. h. c. F. Porsche K.G., Stuttgart-Zuffenhausen, Germany

[22] Filed: Sept. 9, 1969

[21] Appl. No.: 856,442

[30] Foreign Application Priority Data

May 17, 1969 Germany......................P 19 25 206.3

[52] U.S. Cl..................................................280/16, 297/192
[51] Int. Cl.................................................................B62b 13/04
[58] Field of Search...................280/12.1, 16, 21, 32.5, 28.5; 297/188, 192, 193, 195; 224/30, 31, 32, 43

[56] References Cited

UNITED STATES PATENTS

| | | | |
|---|---|---|---|
| 2,093,912 | 9/1937 | Hayes et al | 280/202 X |
| 2,613,722 | 10/1952 | Ruppert | 297/195 X |
| 2,725,923 | 12/1955 | Bachrach | 297/193 |
| 3,178,196 | 4/1965 | Colace | 280/16 |
| 3,436,091 | 4/1969 | Brenter | 280/16 |
| 3,514,156 | 5/1970 | Fields | 297/195 X |

FOREIGN PATENTS OR APPLICATIONS

| | | | |
|---|---|---|---|
| 1,039,069 | 5/1953 | France | 280/25 |
| 370,548 | 4/1932 | Great Britain | 297/195 |
| 516,832 | 1/1940 | Great Britain | 297/195 |

*Primary Examiner*—Benjamin Hersh
*Assistant Examiner*—Winston H. Douglas
*Attorney*—Craig, Antonelli & Hill

[57] ABSTRACT

A one-track sliding vehicle or sled having a supporting frame, a steering mechanism, a front steering runner and a rear sliding runner. The sled is also provided with a passenger seat which can either be hingedly mounted to the supporting frame or detachably connected to the supporting frame. Further, the seat is useful for storing equipment articles of the driver and/or of the sled itself. For example, the steering mechanism, which can be constructed so as to be detachable from the supporting frame, can be accommodated in recesses provided in the undersurface of the seat and held in that position under tension.

8 Claims, 4 Drawing Figures

PATENTED JAN 18 1972 3,635,489

Inventor:
Ferdinand Alexander Porsche
By Craig, Antonelli, Stewart & Hill
ATTORNEYS

SEAT FOR A ONE-TRACK SLIDING VEHICLE

BACKGROUND OF THE INVENTION

The present invention relates to a one-track sliding vehicle or sled, and more particularly, to a one-track sliding vehicle with a supporting frame and a seat which increases the comfort of the vehicle.

In a conventional sliding vehicle similar in construction to the above-mentioned type, the seats are designed merely as supporting elements for the driver. No further utility can be accomplished by seats of this construction, as can be seen, for example, in German Pat. No. 801,552 and French Pat. No. 1,039,069.

SUMMARY OF THE INVENTION

It is the aim of the present invention to broaden the functional range or usefulness of a seat for a one-track sliding vehicle by utilization of uncomplicated constructional techniques.

The foregoing is accomplished in accordance with the present invention by providing the seat, outside of the seat area proper, with devices for the accommodation of equipment of the driver and/or of the vehicle. In this connection, it is advantageous to dispose the equipment-accommodating devices on the underside of the seat. Further, it is especially advantageous if the seat consists of a body of elastic material, preferably foamed plastic, and if the article-receiving devices at the seat are formed by recesses provided in the body material of the seat. In addition, it is advantageous to dimension the recesses in such a manner that they retain the articles in position under tension.

The advantages attained by the present invention can be seen especially from the fact that the accessory parts of the sliding vehicle, as well as the driver's equipment articles, can be accommodated in the seat of the sliding vehicle, thereby obviating the need for the driver to take along any cumbersome storage bags, additional containers or the like. The storage devices provided on the underside of the seat which is constructed so as to be hinged or foldable and/or detachable make it possible to accommodate the equipment articles of the driver and/or of the vehicle in a completely protected and noninterfering manner.

BRIEF DESCRIPTION OF THE DRAWINGS

These and further features, advantages and objects of the present invention will become more apparent from the following description when taken in connection with the accompanying drawings which show, for purposes of illustration only, an embodiment in accordance with the present invention, and wherein.

DETAILED DESCRIPTION OF THE DRAWINGS

Figure 1:
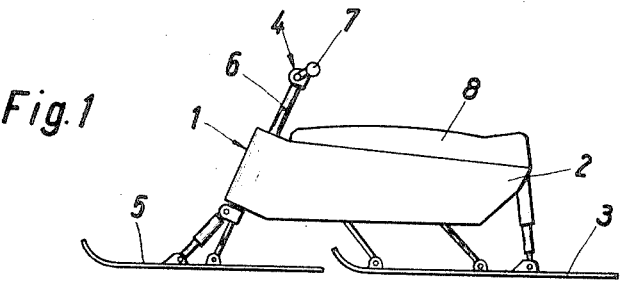
FIG. 1 is a lateral view of a sliding vehicle with a seat in accordance with the present invention.

With reference now to the drawings and, in particular, to FIG. 1, the sliding vehicle 1 comprises a supporting frame 2, on which are provided a rear sliding runner 3 and a front steering runner 5 pivotably connected with a steering mechanism 4. The steering mechanism 4 has a connecting member 6 and a steering device such as, for example, a handlebar 7 both of which are detachably connected with respect to each other and thus making possible the quick and easy detachment and removal of the steering mechanism 4 from the supporting frame 2.

Figure 4:
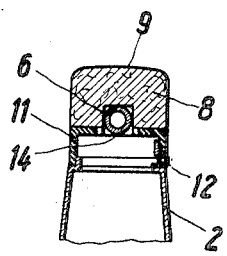
FIG. 4 is a sectional view along line IV—IV of FIG. 2.

An upholstered seat 8 consisting of a foamed plastic is provided on the upper side of the supporting frame 2. The seat 8 extends substantially over the entire length of the supporting frame 2, with the seat surface 9 having an undulating or wavy profile. A structurally rigid supporting member 10 is provided in the rear zone or portion of the seat 8 and is incorporated into the foamed plastic material of the seat 8, thereby counteracting any undesired tendency for the driver to slide off from the seat surface 9 inadvertently. A reinforcing frame 11 is disposed on the side of the seat 8 that is opposite to the seat surface 9. The reinforcing frame 11 consists of a structurally rigid material and is connected with the seat 8 by conventional bonding means such as, for example, cementing or glueing. Furthermore, the seat 8 is hingedly connected to the longitudinal side of the supporting frame 2 by hinge means 12, as can be seen in FIG. 4. On the other hand, the seat 8 can also be attached to the supporting frame 2 so as to be completely detachable.

Also on the underside of the seat 8, devices 13, 14 are provided for the accommodation of equipment articles of the driver and/or of the vehicle. The devices 13, 14 are formed by recesses provided in the foamed plastic material of the seat 8. The recesses are dimensioned so that they hold the articles in position by tension means, thereby eliminating any need for additional retaining means.

Figure 2:
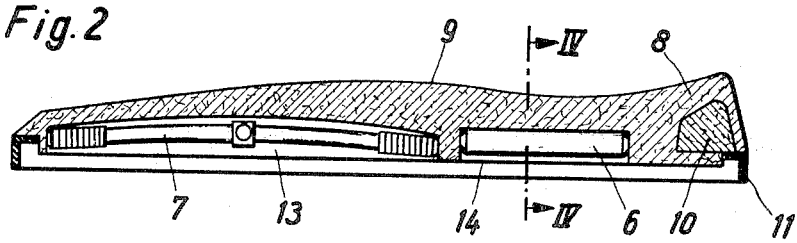
FIG. 2 is a longitudinal central section through the seat of FIG. 1 on an enlarged scale.
Figure 3:
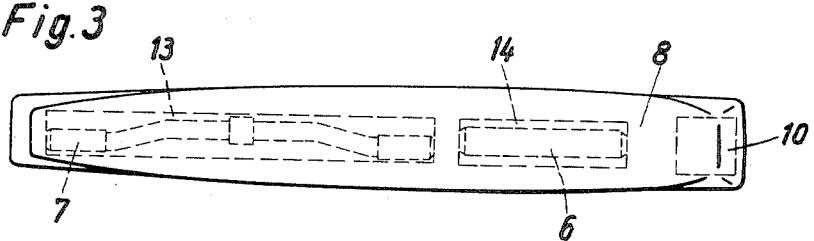
FIG. 3 is a top view of the seat of FIG. 2.

From FIGS. 2 and 3, it can be seen that the handlebar 7 and the connecting member 6 of the steering mechanism 4 are accommodated in each of the recesses 13, 14 of the seat 8. It is also possible, on the other hand, to provide for the accommodation of other types of equipment articles by merely varying the configuration of the recesses.

While I have shown and described only one embodiment in accordance with the present invention, it is understood that the same is not limited thereto but is susceptible of numerous changes and modifications as known to a person skilled in the art, and I, therefore do not wish to be limited to the details shown and described herein but intend to cover all such changes and modifications as encompassed by the scope of the invention.

I claim:

1. A one-track sliding vehicle having a supporting frame and a seat operatively associated with said supporting frame, wherein the improvement essentially comprises equipment-accommodating means being provided at the underside of said seat for accommodating equipment articles of the driver and/or of the vehicle, said seat including a body constructed of foamed plastic material, and wherein said equipment-accommodating means consists of at least one recess provided in the material of said seat.

2. A one-track sliding vehicle according to claim 1, wherein said seat is hingedly connected at said supporting frame.

3. A one-track sliding vehicle according to claim 1, wherein said seat is detachably associated with respect to said supporting frame.

4. A one-track sliding vehicle according to claim 1, wherein a plurality of recesses are provided, said recesses being dimensioned so as to retain equipment articles in position under tension.

5. A one-track sliding vehicle according to claim 4, wherein said seat is hingedly connected at said supporting frame.

6. A one-track sliding vehicle comprising a supporting frame, a seat operatively associated with said supporting frame, equipment-accommodating means located at said seat for accommodating equipment articles of the driver and/or of the vehicle, a front steering runner and a rear sliding runner being operatively associated with said supporting frame, a steering mechanism rotatably mounted at said supporting frame, said steering mechanism including a connecting member and a steering device detachably connected to one another and to said supporting frame, said seat including a body of foamed plastic elastic material, said seat being hingedly connected along a longitudinal wall at said supporting frame, and wherein said equipment-accommodating means consists of a plurality of recesses provided in the material of said seat, said recesses being dimensioned for retaining articles in position under tension.

7. A one-track sliding vehicle according to claim 6, wherein said recesses are adapted to receive said connecting member and said steering device after being disassembled from said supporting frame.

8. A one-track sliding vehicle according to claim 6, wherein said recesses are located at the underside of said seat.

* * * * *